United States Patent
Park (10) Patent No.: US 9,494,840 B2
(45) Date of Patent: Nov. 15, 2016

(54) ELECTROCHROMIC MIRROR AND ROOM MIRROR MODULE FOR VEHICLE COMPRISING THE SAME

(71) Applicant: LG INNOTEK CO., LTD., Seoul (KR)

(72) Inventor: Sang Young Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/035,981

(22) Filed: Sep. 25, 2013

(65) Prior Publication Data

US 2014/0085700 A1 Mar. 27, 2014

(30) Foreign Application Priority Data

Sep. 27, 2012 (KR) .................. 10-2012-0108097

(51) Int. Cl.
*G02F 1/153* (2006.01)
*G02F 1/157* (2006.01)
*B60R 1/08* (2006.01)
*G02F 1/15* (2006.01)

(52) U.S. Cl.
CPC ............... *G02F 1/157* (2013.01); *B60R 1/088* (2013.01); *G02F 1/1508* (2013.01); *G02F 2001/1515* (2013.01)

(58) Field of Classification Search
CPC ...... G02F 1/155; G02F 2201/34; B60R 1/02
USPC .................... 359/265–275; 345/105
See application file for complete search history.

(56) References Cited

U.S. PATENT DOCUMENTS

| | | | | |
|---|---|---|---|---|
| 4,550,982 A | * | 11/1985 | Hirai | 359/274 |
| 4,752,119 A | * | 6/1988 | Ueno et al. | 359/273 |
| 4,938,571 A | * | 7/1990 | Cogan et al. | 359/275 |
| 5,724,187 A | * | 3/1998 | Varaprasad et al. | 359/608 |
| 5,825,526 A | * | 10/1998 | Bommarito et al. | 359/265 |
| 6,178,034 B1 | * | 1/2001 | Allemand et al. | 359/265 |
| 6,285,486 B1 | * | 9/2001 | Kobayashi et al. | 359/265 |
| 6,950,221 B1 | * | 9/2005 | Terada et al. | 359/266 |
| 7,158,276 B1 | | 1/2007 | Peng et al. | |
| 7,586,663 B1 | * | 9/2009 | Radmard et al. | 359/265 |
| 8,760,749 B2 | * | 6/2014 | Melcher | G02F 1/1533 359/265 |
| 2004/0233537 A1 | * | 11/2004 | Agrawal et al. | 359/604 |
| 2009/0128882 A1 | * | 5/2009 | Das et al. | 359/265 |
| 2011/0233532 A1 | | 9/2011 | Sotzing et al. | |

OTHER PUBLICATIONS

European Search Report dated Nov. 11, 2013 in European Application No. 13185688.

* cited by examiner

*Primary Examiner* — Tuyen Tra
(74) *Attorney, Agent, or Firm* — Saliwanchik, Lloyd & Eisenschenk (57) ABSTRACT

Provided are an electrochromic mirror and a method of manufacturing the same, the electrochromic mirror including: a first substrate and a second substrate facing each other; and an electrochromic layer interposed between the first substrate and the second substrate and containing an electrochromic material and an electrolyte, wherein at least one of the first substrate and the second substrate is a transparent film, whereby an entire thickness and weight of the electrochromic mirror can be reduced, and as a result, the degree of design freedom can be improved, and since the electrochromic layer containing the electrochromic material and the electrolyte is formed by a coating method, the efficiency of a manufacturing process can be improved, and a production cost can be reduced.

9 Claims, 7 Drawing Sheets

ELECTROCHROMIC MIRROR AND ROOM MIRROR MODULE FOR VEHICLE COMPRISING THE SAME

CROSS-REFERENCE TO RELATED APPLICATION

This application claims the benefit under 35 U.S.C. §119 of Korean Patent Application No. 10-2012-0108097, filed Sep. 27, 2012, which is hereby incorporated by reference in its entirety.

BACKGROUND

Field of the Invention

Embodiments of the present invention relate to an electrochromic mirror and a structure thereof.

Description of the Related Arts

Electrochromism is the phenomenon displayed by some materials of reversibly changing color due to the direction of an electric field when a voltage is applied. A material capable of undergoing the reversible changes of optical properties by an electrochemical redox reaction accompanying such electrochromism properties is called an electrochromic material. That is, the electrochromic material does not have a color when an electrical signal is not applied from an external source, and then has a certain color when the electrical signal is applied. On the contrary to this, the electrochromic material has a certain color when the electrical signal is not applied from the external source, and then the color disappears when the electrical signal is applied.

An electrochromic device, which is a device using the phenomenon in which light transmission of the electrochromic material is changed by an electrochemical redox reaction, has been used for adjusting the light transmission or reflectance of a window glass for building or a mirror for automobiles. Recently, as the electrochromic device has been known to have an infrared cutoff effect as well as a color variation in a visible ray area, it has been receiving a great deal of attention with regard to the possibility of application as an energy-saving type product.

In particular, the electrochromic mirror (ECM) is a mirror which stably protects a driver's field of vision by providing a variation in reflectance depending upon discoloration of the mirror while automatically sensing the strong beam of a car reflected from a car mirror in the daytime or at night.

Figure 1:
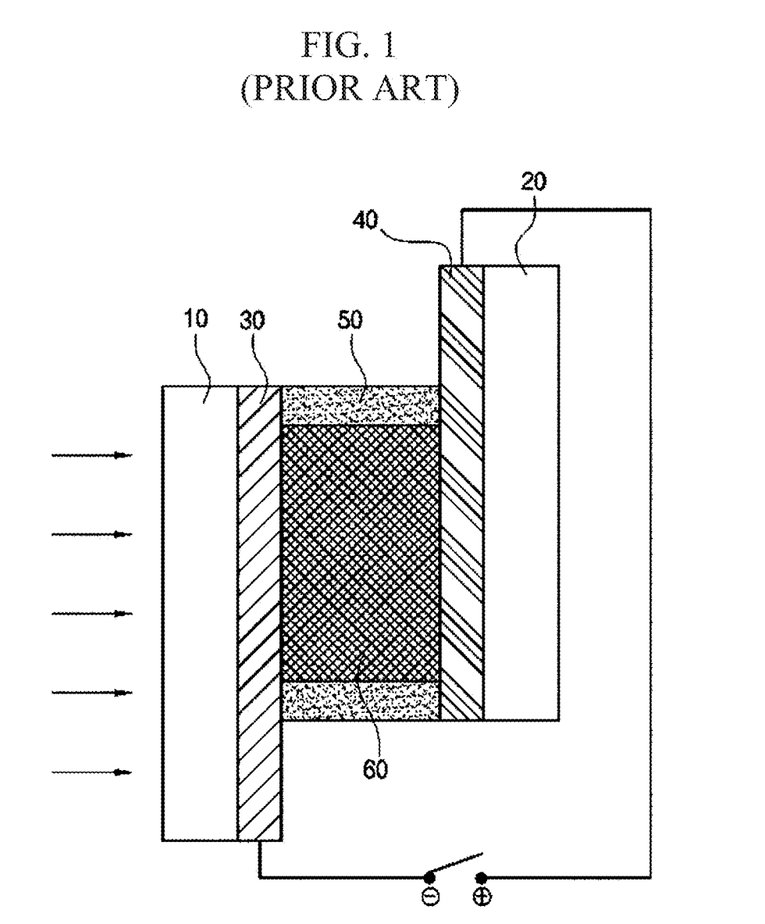
FIG. 1 schematically illustrates a structure of a conventional electrochromic device.

FIG. 1 illustrates a schematic structure of a conventional electrochromic mirror. Referring to the drawing, the conventional electrochromic device is configured such that a first transparent substrate 10 and a second transparent substrate 20 facing each other are disposed to be spaced apart from each other, a transparent electrode 30 and a conductive reflection layer 40 are each formed on facing surfaces of the first and second transparent 10 and 20, a space is formed between the transparent electrode 30 and the conductive reflection layer 40 using a sealant 50, and an electrochromic layer 60 is formed by injecting an electrochromic material and an electrolyte into the space formed as above. This conventional electrochromic device, particularly, the electrochromic mirror, functions to protect a driver's field of vision by using the electrochromic material in order to reduce the reflectance of light.

However, in the conventional electrochromic mirror, when the electrochromic layer 60 is formed, air and moisture of the outside should be blocked in order to increase the durability of an electrochromic function. To do so, the electrochromic material and the electrolyte should be injected in a vacuum state by bonding the first transparent substrate 10 and the second transparent substrate 20.

Accordingly, the conventional electrochromic mirror is problematic in that a high cost is generated due to the vacuum bonding process, and a weight increases because two transparent substrates 10 and 20 such as a glass substrate are used, and in consideration of this, there is a need to design a housing.

BRIEF SUMMARY

Accordingly, embodiments of the present invention have been made keeping in mind the above problems occurring in the related art. An aspect of embodiments of the present invention provides an electrochromic mirror that can reduce an entire thickness and weight by using a flexible transparent film in at least any one of a first substrate and a second substrate, can improve a degree of design freedom by reducing the thickness and weight, and can simplify a manufacturing process and reduce a production cost by applying a coating method in replacement of a conventional vacuum injection process.

According to an aspect of embodiments of the present invention, there is provided an electrochromic mirror, including: a first substrate and a second substrate facing each other; and an electrochromic layer interposed between the first substrate and the second substrate, wherein at least one of the first substrate or the second substrate is a transparent film material.

According to the embodiments of the present invention, as at least one of the first substrate and the second substrate in the electrochromic mirror is replaced with the flexible transparent film, the entire thickness and weight of the electrochromic mirror can be reduced, and the degree of design freedom can be improved according to the reduction in thickness and weight of the electrochromic mirror.

Also, according to embodiments of the present invention, as the electrochromic layer is formed by the coating (laminating) method different from the conventional vacuum injection process of the electrochromic material and the electrolyte, this makes it possible to efficiently perform a manufacturing process and to reduce a production cost.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION

The embodiments of the present invention that an ordinary person skilled in the art can implement will be described with reference to the accompanying drawings. The embodiments in the specification and the constructions shown in the drawings are provided as a preferred embodiment of the present invention, and it should be understood that there might be various equivalents and modifications which could substitute at the time of filing. In addition, when it comes to the operation principle of the preferred embodiments of the present invention, when the known functions or functions are seemed to make unclear the subject matters of the present invention, they will be omitted from the descriptions of the invention. The terms below are defined in consideration of the functions of the present invention, and the meaning of each term should be interpreted by judging the whole parts of the present specification, and the elements having the similar functions and operations of the drawings are given the same reference numerals.

The gist of embodiments of the present invention is to provide an electrochromic mirror and a method of manufacturing the same that can reduce an entire thickness and weight of the electrochromic mirror by using a flexible transparent film in at least one of a first substrate and a second substrate in an electrochromic device, can improve the degree of design freedom by the reduction in thickness and weight, and can simplify a manufacturing process and reduce a production cost by using a coating method.

FIG. 2 to FIG. 9 are views illustrating various embodiments of a structure of an electrochromic mirror according to the present invention.

Figure 2:
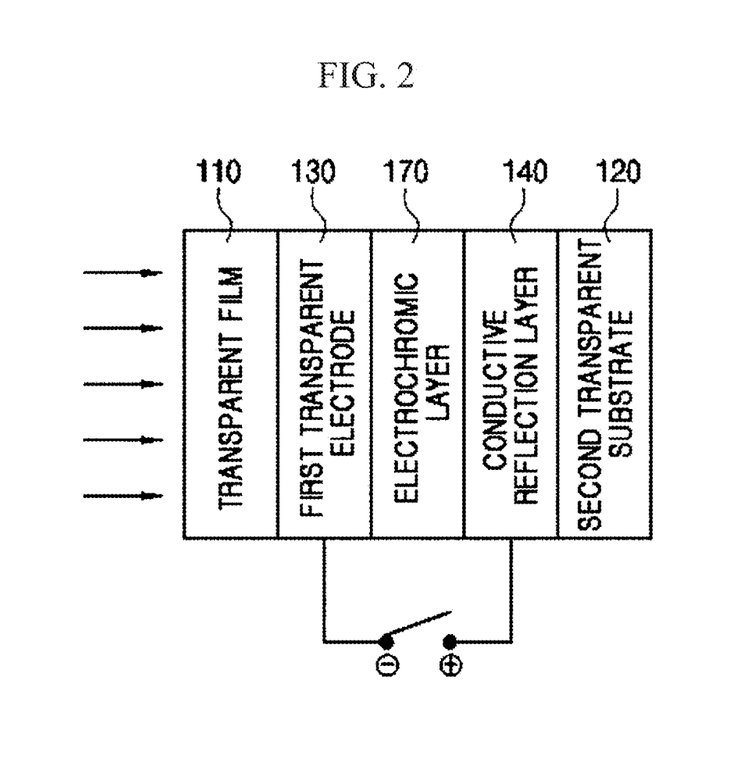
FIG. 2 to FIG. 9 are views illustrating various embodiments of a structure of an electrochromic mirror according to the present invention.

Referring to FIG. 2, an electrochromic mirror according to an embodiment of the present invention may include: a first substrate 110 and a second substrate 120 facing each other at a predetermined distance; a first transparent electrode 130 and a conductive reflection layer 140 each formed on facing surfaces of the first substrate 110 and the second substrate 120; an electrochromic layer 170 formed between the first transparent electrode 130 and the conductive reflection layer 140, wherein the first substrate 110 is composed of a transparent film.

In the conventional electrochromic mirror, the first substrate and the second substrate are composed of a transparent substrate such as a glass substrate and the like, but in the electrochromic mirror according to the embodiments of the invention, at least one of the first substrate 110 and the second substrate 120 is composed of a flexible transparent film. FIG. 2 illustrates a case in which only the first substrate 110 is composed of the transparent film. Only the second substrate 120 may be the transparent film, or both the first substrate 110 and the second substrate 120 may be the transparent film. This will be explained in detail in the explanation sections based on FIG. 4 to FIG. 7.

The transparent film used as the first substrate 110 may be made of any one of polyethylene terephthalate (PET), polycarbonate (PC), an acrylonitrile-butadiene-styrene copolymer (ABS), polymethyl methacrylate (PMMA), polyethylene naphthalate (PEN), polyether sulfone (PES), a cyclic olefin copolymer (COC), a TAC (triacetylcellulose) film, a polyvinyl alcohol (PVA) film, a polyimide (PI) film, and polystyrene (PS). This is only an example, but is not limited.

In the conventional electrochromic mirror, since transparent substrates such as a glass substrate and the like are used as both the first substrate and the second substrate, when an electrochromic material and an electrolyte are injected, they are injected in a vacuum state by bonding the glass substrates to each other, thereby causing an increase in cost due to the vacuum bonding process, and an increase in weight and thickness resulting from use of the glass substrates.

On the contrary, in the electrochromic mirror according to the embodiments of the invention, as the flexible transparent film 110 is used, the electrochromic layer may be formed by the coating (laminating) method instead of the vacuum bonding method of an electrochromic material and an electrolyte. Thus, this makes it possible to efficiently perform a manufacturing process, to implement a reduction in production cost, and to reduce an entire thickness and weight of the electrochromic mirror, thereby increasing the degree of design freedom.

The first transparent electrode 130 may be deposited on the transparent film 110 which is the first substrate, and may be any one selected from the group consisting of ITO (Indium Tin Oxide), FTO (Fluor doped Tin Oxide), AZO (Aluminum doped Zinc Oxide), GZO (Gallium doped Zinc Oxide), ATO (Antimony doped Tin Oxide), IZO (Indium doped Zinc Oxide), NTO (Niobium doped Titanium Oxide), ZnO, and a combination thereof. However, this is only an example, but is not limited.

The conductive reflection layer 140 may be formed on the second substrate 120, and may serve as a reflective plate reflecting light incident by passing through the electrochromic layer 170 and a counter electrode of the first transparent electrode 130. Also, the conductive reflection layer 140 may be composed of at least one metal selected from the group consisting of Cu, Au, Ag, Ni, Al, Cr, Ru, Re, Pb, Sn, In and Zn, or an alloy containing these metals. However, this is only an example, but is not limited.

Figure 3:
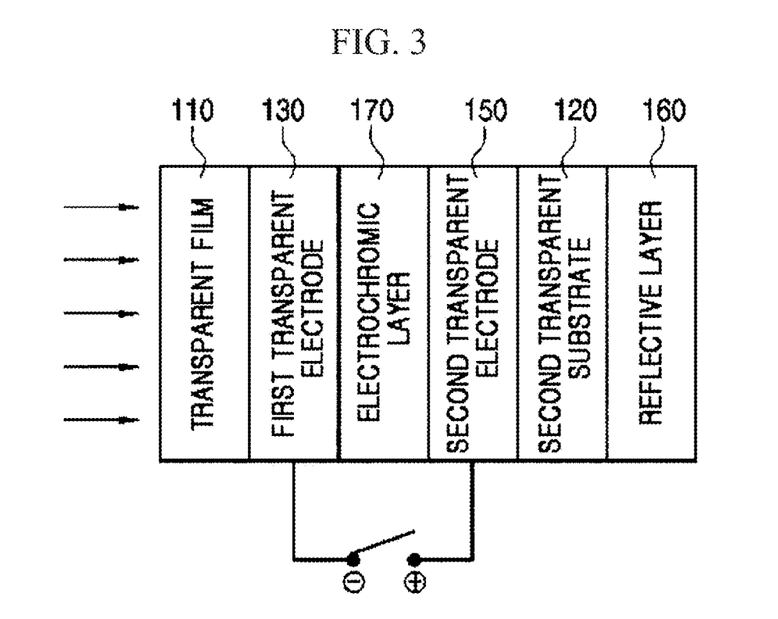
Figure 5:
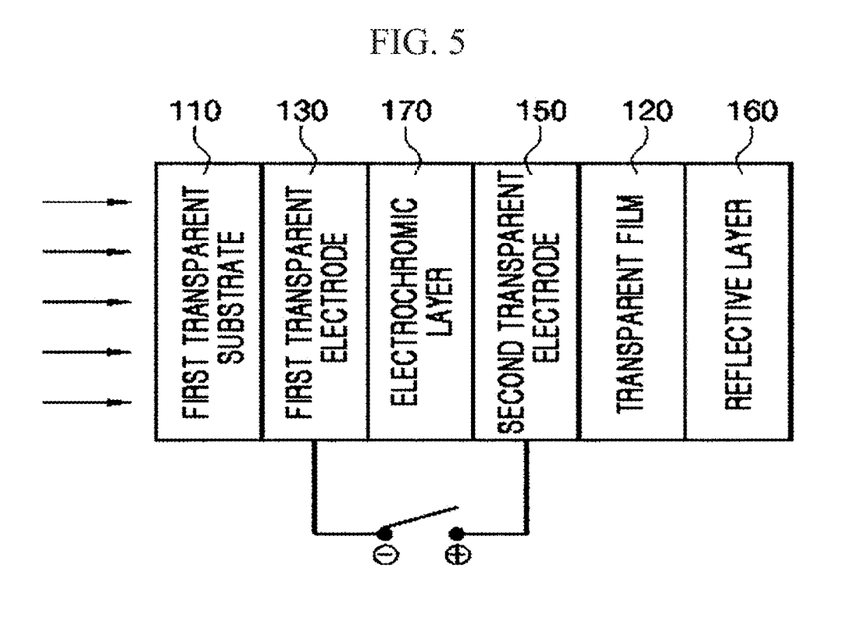
Figure 7:
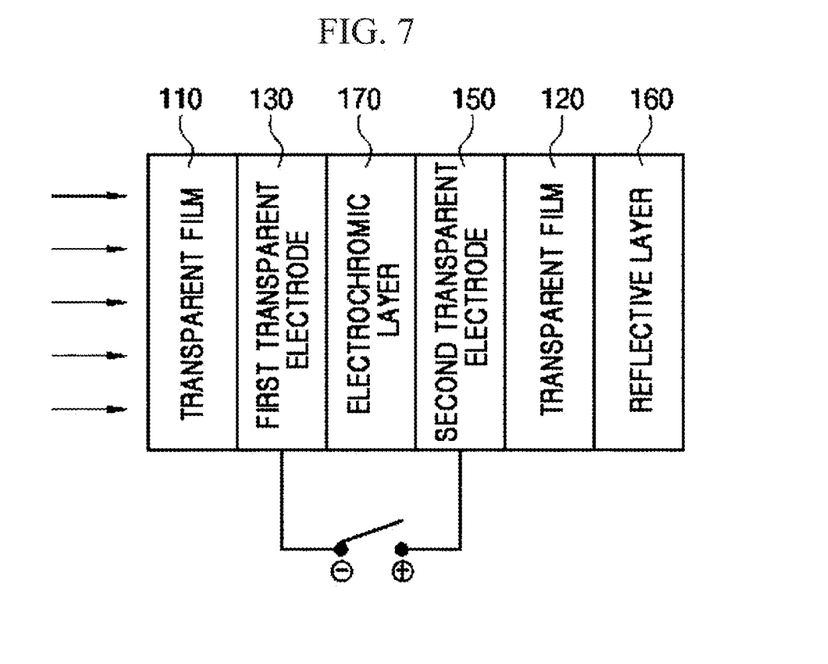

As shown in FIG. 3, FIG. 5 and FIG. 7, a second transparent electrode 150 in replacement of the conductive reflection layer 140 may be formed. In this case, a reflective layer 160 reflecting light incident to one surface of the second substrate 120 on which the second transparent electrode 150 is not formed may be formed.

The electrochromic layer 170 may be made of a liquid or solid electrochromic material and an electrolyte, and may be formed between the first transparent electrode 130 and the conductive reflection layer 140, thereby causing coloring or decolorization through an oxidation reaction or a reduction reaction by receiving electricity applied from the first transparent electrode 130 and the conductive reflection layer 140. The electrochromic layer 170 may be formed by the vacuum bonding method as the conventional method which is performed in such a way to inject the electrochromic material and the electrolyte into a gap between the first transparent electrode 130 and the conductive reflection layer 140. Since the electrochromic layer 170 may be formed by the coating method according to application of the transparent film 110, the efficiency of a manufacturing process and a reduction in production cost can be implemented.

The electrochromic material is a material having an electrochromic characteristic in which light absorptivity is changed by the electrochemical oxidation-reduction reaction, and the electrochemical oxidation-reduction phenomenon of the electrochromic material is reversibly generated depending on whether or not a voltage is applied, and intensity of the voltage so that transmittancy and absorbance of the electrochromic material can be reversibly changed.

As the electrochromic material, a metal oxide electrochromic material containing tungsten, iridium, nickel and vanadium, an organic electrochromic material containing viologen and quinone, a conductive polymer electrochromic material containing polythiophene, polyaniline and polypyrrole, and a derivative thereof may be applied. Specifically, the electrochromic material may be any one selected from the group consisting of polythiophene, polyaniline, polypyrrole, polyanthracene, polyfluorene, polycarbazole, polyphenylenevinylene, and a derivative thereof.

Figure 8:
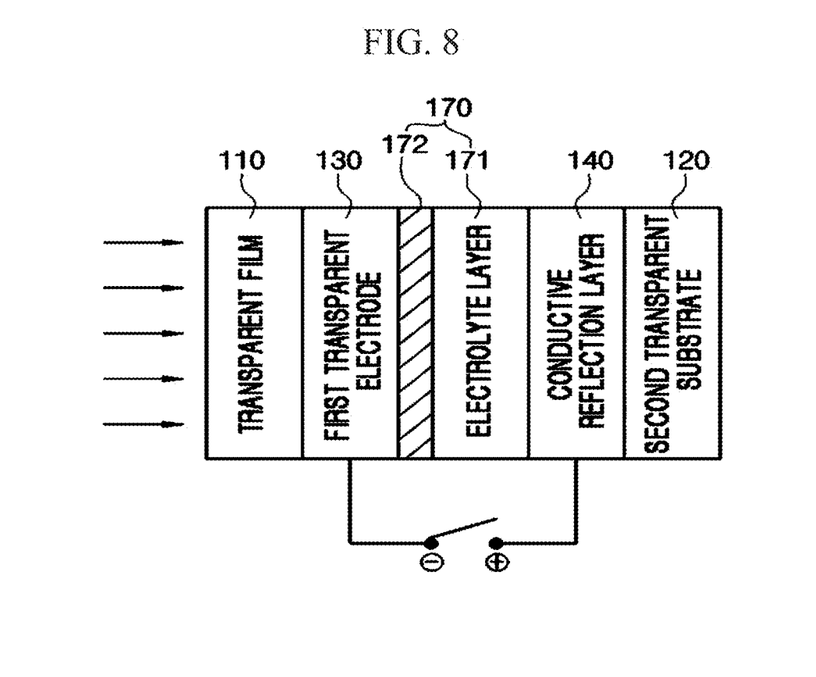
Figure 9:
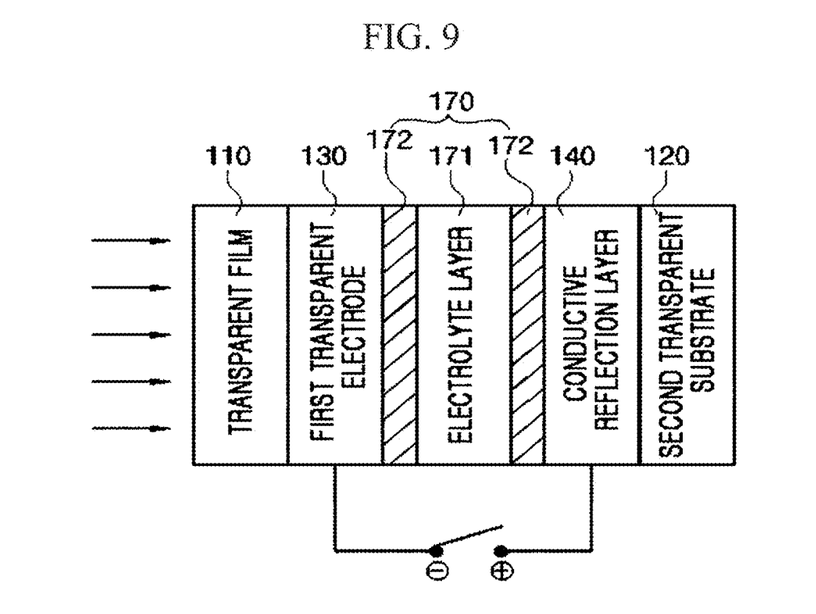

At this time, the electrochromic material may be in a liquid state or a solid state. When it is in a solid state, as shown in FIG. 8 and FIG. 9, the electrochromic layer 170 may include an electrolyte layer 171 and an electrochromic coating layer 172 formed on one surface of both surfaces of the electrolyte layer 171. That is, as illustrated in FIG. 8, the electrochromic coating layer 172 may be formed only between the electrolyte layer 171 and the first transparent electrode 130, may be formed only between the electrolyte layer 171 and the conductive reflection layer 140 even though this is not illustrated, or may be formed on both surfaces of the electrolyte layer 171 as shown in FIG. 9. When the electrochromic element is in a liquid state, uniform discoloration is not performed, and in order to maintain an electrochromic state, a voltage should be continuously applied, thereby causing high power consumption. However, when the electrochromatic coating layer 172 is formed in the solid state as described above, this enables uniform discoloration and decolorization to be performed. Also, since the electrochromic material has a memory effect, a voltage is applied only upon the discoloration and decolorization, and thus low power consumption is required, and since a reverse voltage is applied upon the decolorization, the speed of a decolorization reaction is fast. Furthermore, since the electrochromic material to which the coating process is applied is an inorganic or organic polymer, durability of the device can be improved.

Referring to FIG. 3, unlike FIG. 2, the second transparent electrode 150 is formed between the electrochromic layer 170 and the second substrate 120, and the reflective layer 160 is formed on one surface of the second substrate on which the second transparent electrode 150 is not formed. The second transparent electrode 150, which is a counter electrode of the first transparent electrode 130, may be any one selected from the group consisting of ITO (Indium Tin Oxide), FTO (Fluor doped Tin Oxide), AZO (Aluminum doped Zinc Oxide), GZO (Gallium doped Zinc Oxide), ATO (Antimony doped Tin Oxide), IZO (Indium doped Zinc Oxide), NTO (Niobium doped Titanium Oxide), ZnO, and a combination thereof. However, this is only an example, but is not limited.

Also, the reflective layer 160, which functions to reflect light incident to the electrochromic mirror, may be composed of at least one metal selected from the group consisting of Cu, Au, Ag, Ni, Al, Cr, Ru, Re, Pb, Sn, in and Zn, or an alloy containing these metals. However, this is only an example, but is not limited. Since the remaining structures except for this are identical to those of FIG. 2, the description thereof will be omitted.

Figure 4:
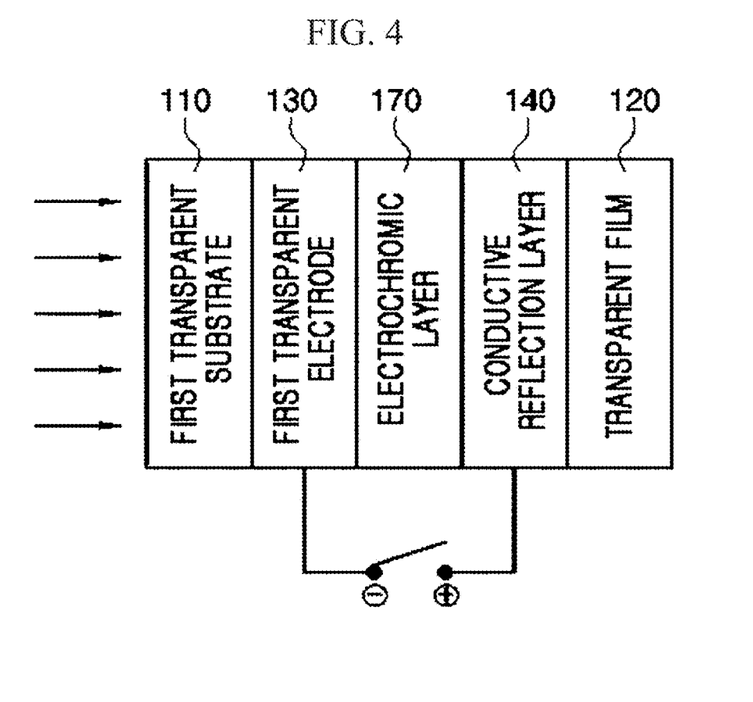

Unlike those of FIG. 2 and FIG. 3, each of the electrochromic mirrors of FIG. 4 and FIG. 5 shows a difference that the conventional transparent substrate such as a glass substrate and the like is used as the first substrate 110, and a transparent film instead of the conventional transparent substrate is used as the second substrate 120. The transparent film 120 applied as the second substrate in FIG. 4 and FIG. 5 may be made of any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), a cyclic olefin copolymer (COC), a TAC (Triacetylcellulose) film, a polyvinyl alcohol (PVA) film, and a polyimide (PI) film, polystyrene (PS) as described in the explanation section with reference to FIG. 2.

As described in the explanation sections with reference to FIG. 2 to FIG. 5, the transparent film may be selectively applied to any one of the first substrate 110 and the second substrate 120.

Figure 6:
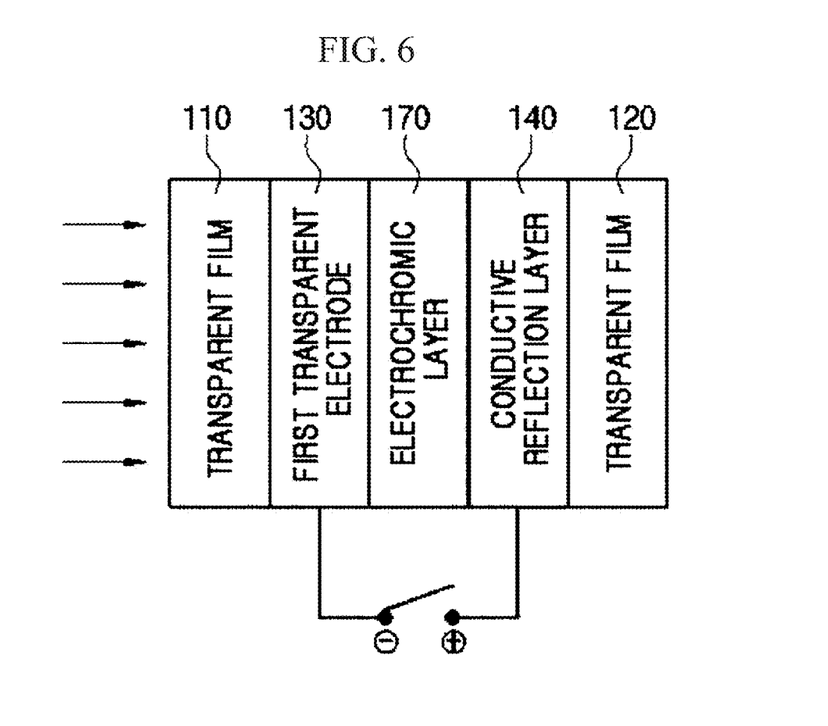

Also, in each of the electrochromic mirrors illustrated in FIG. 6 and FIG. 7, the flexible transparent film instead of the conventional transparent substrate such as the glass substrate is applied to the first substrate 110 and the second substrate 120. As remaining structures except for this, the structures of the first and second transparent electrodes 130 and 150, the electrochromic layer 170, the conductive reflection layer 140, and the reflective layer 160 are identical to those of FIG. 2 to FIG. 5, and thus the description thereof will be omitted.

As described in the explanation section with reference to FIG. 2, in FIG. 8 and FIG. 9, when the electrochromic material is in the solid state, the electrochromic layer 170 may include the electrolyte layer 170 and the electrochromic coating layer 172 formed on one surface or both surfaces of the electrolyte layer 171. Accordingly, as illustrated in FIG. 8, the electrochromic coating layer may be formed only between the electrolyte layer and the first transparent electrode, may be formed only between the electrolyte layer and the conductive reflection layer (not drawn), or may be formed on the both surfaces of the electrolyte layer 171 illustrated in FIG. 9. As described above, when the electrochromic coating layer is formed, this enables uniform discoloration and decolorization to be performed. Also, since the electrochromic material has a memory effect, a voltage is applied only upon the discoloration and decolorization, and thus low power consumption is required, and since a reverse voltage is applied upon the decolorization, the speed of a decolorization reaction is fast. Furthermore, since the electrochromic material to which the coating process is applied is an inorganic or organic polymer, durability of the device can be improved.

The electrochromic coating layer 172 and the electrolyte layer 171 of FIG. 8 and FIG. 9 are illustrated based on FIG. 2 as one example, but it would be obvious to those having ordinary skill in the art that the electrochromic coating layer 172 and the electrolyte layer 171 could be also applied to the electrochromic mirrors of FIG. 3 to FIG. 7 under the same condition. At this time, in the cases of FIG. 3, FIG. 5 and FIG. 7 in which the second transparent electrode instead of the conductive reflection layer is formed, the electrochromic coating layer may be formed between the electrolyte layer and the second transparent electrode.

Figure 10:
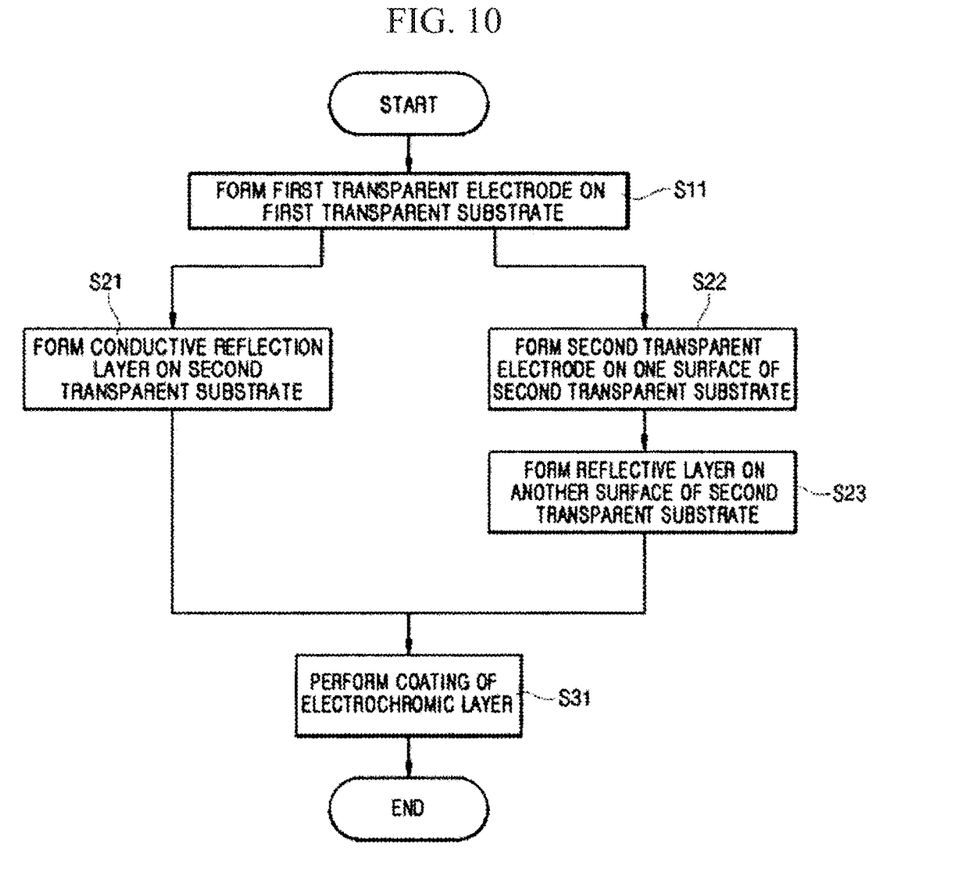
FIG. 10 is a flow chart illustrating a method of manufacturing an electrochromic mirror according to the embodiment of the present invention.

As described in the explanation sections with reference to FIG. 2 to FIG. 9, in the embodiments of the present invention, the transparent film may be applied to at least one of the first substrate 110 and the second substrate 120. That is, the transparent film may be applied to only the first substrate 110, or only the second substrate 120. Alternately, the transparent film may be applied to both the first substrate 110 and the second substrate 120. As such, as the flexible film is used as the substrate, the coating (laminating) process can be performed, and thus a high cost generated due to the conventional vacuum bonding process can be reduced. Furthermore, the efficiency of a manufacturing process can be improved, and an entire thickness and weight of the electrochromic mirror can be also reduced. FIG. 10 is a flow chart illustrating a method of manufacturing the electrochromic mirror according to the embodiment of the present invention. Hereinafter, the description of the constitutive elements as explained in the explanation sections with reference to FIG. 2 to FIG. 9 will be omitted, and the description of a manufacturing process will be performed.

Referring to FIG. 10, the first transparent electrode is formed on the first substrate (S11), and the conductive reflection layer is formed on the second substrate (S21). At this time, at least one of the first substrate and the second substrate may be composed of a transparent film. When the substrate is composed of the transparent film, the transparent electrode or the conductive reflection layer may be formed by the coating process.

However, as shown in FIG. 3, FIG. 5 and FIG. 7, when the second transparent electrode instead of the conductive reflection layer is formed on the second substrate, the second transparent electrode may be formed on the second substrate (S22), and the reflective layer may be formed on one surface of the second substrate on which the second transparent electrode is not formed (S23).

After this, the electrochromic layer made of the electrochromic material and the electrolyte is located between the first transparent electrode and the conductive reflection layer, or between the first transparent electrode and the second transparent electrode, thereby manufacturing the electrochromic mirror by the coating (laminating) process using the substrate made of the transparent film (S31).

In the conventional electrochromic mirror, since the coating process could not be applied due to a property of the hard glass substrate, the electrochromic material and the electrolyte should be injected by the vacuum bonding process. However, in the electrochromic mirror according to the embodiment of the present invention, since the flexible transparent film is used as the substrate, the coating process can be applied, so that the thickness and weight of the electrochromic mirror can be reduced, and as a result, the degree of design freedom can be improved.

Figure 11:
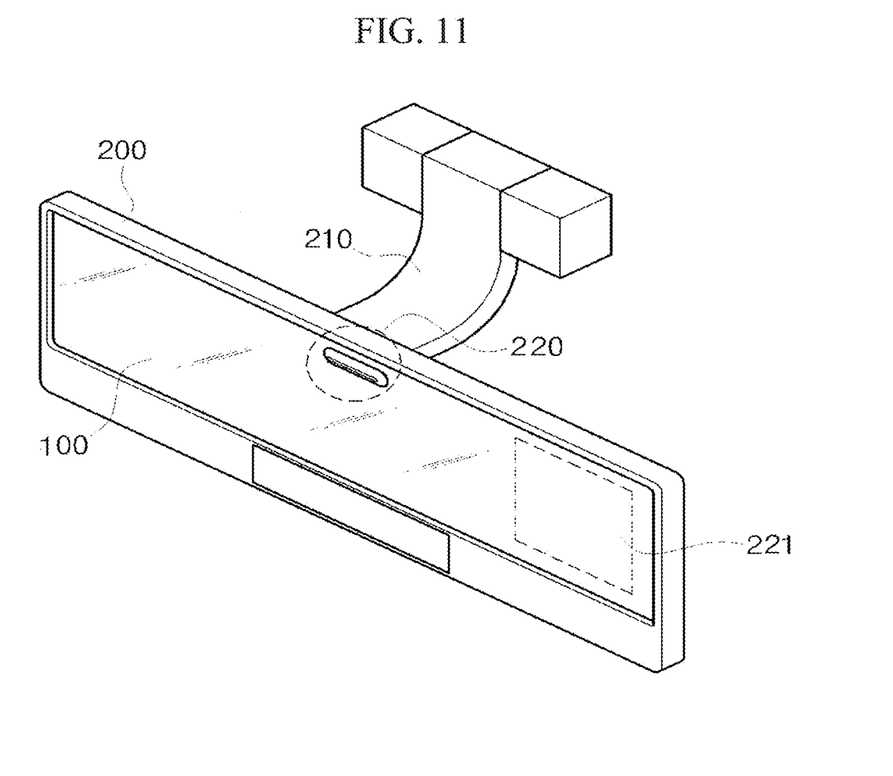
FIG. 11 is a view illustrating a structure of a room mirror module for a vehicle to which the electrochromic mirror according to the embodiment of the present invention is applied.

FIG. 11 is a view illustrating a structure of a room mirror module for a vehicle including the electrochromic mirror according to the embodiment of the present invention.

A room mirror module for a vehicle according to the other embodiment of the present invention may be implemented in a structure which includes the electrochromic mirror 100 according to the aforesaid embodiments of the present invention.

Of course, in this case, the room mirror module for the vehicle may be formed in a structure that includes a room mirror housing 200 in which the electrochromic mirror 100 is mounted on one surface.

Additionally, the room mirror module for the vehicle may include: a photo sensor 220 detecting the intensity of light; a display unit 200 formed in a partial area of a rear surface of the electrochromic mirror 100; a control unit controlling the electrochromic mirror 300 and the display unit 200 by determining the intensity of light detected by the photo sensor 110 and movement of the vehicle detected by an MEMS sensor 120 (not drawn); and a fixing member 210 fixing the room mirror housing 200 to a frontal glass part of the vehicle.

The room mirror module for the vehicle according to the other embodiment of the present invention is implemented by applying the flexible transparent film to the substrate of the electrochromic mirror itself so that the entire thickness and weight of the electrochromic mirror can be reduced, and as a result, the degree of design freedom can be improved. A shape of the room mirror module is not limited to that illustrated in FIG. 11. The room mirrors having various shapes can be freely designed and manufactured.

The embodiments are disclosed in the drawings and the specification. The specific terms used herein are for the purpose of describing particular embodiments only and are not intended to be limiting of example embodiments. Thus, in the detailed description of the invention, having described the detailed exemplary embodiments of the invention, it should be apparent that modifications and variations can be made by persons skilled without deviating from the spirit or scope of the invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims and their equivalents.

What is claimed is:

1. An electrochromic mirror, comprising:
a first substrate and a second substrate facing each other;
an electrochromic layer interposed between the first substrate and the second substrate;
a first electrode interposed between the first substrate and the electrochromic layer;
a conductive reflection layer interposed between the electrochromic layer and the second substrate; and
a voltage source connected to the first electrode and the conductive reflection layer;
wherein at least one of the first substrate and the second substrate is a flexible transparent film material;
wherein the electrochromic layer has a memory effect related to discoloration and decolorization of the electrochromic layer;
wherein the electrochromic mirror is configured such that the voltage source applies a voltage based on a memory of the electrochromic layer such that the voltage is applied only upon the discoloration and decolorization of the electrochromic layer, and the voltage source applies a reverse voltage such that the reverse voltage is applied upon the decolorization;
wherein the electrochromic layer corn irises a solid electrochromic material layer and an electrolyte layer; and
wherein the solid electrochromic material layer is coated on both surfaces of the electrolyte layer.

2. The electrochromic mirror of claim 1, wherein at least one of the first substrate and the second substrate is a substrate made of a transparent material.

3. The electrochromic mirror of claim 2, wherein the conductive reflection layer comprises: a second electrode formed between the electrochromic layer and one surface of the second substrate; and a reflective layer formed on another surface opposite to the one surface of the second substrate.

4. The electrochromic mirror of claim 3, wherein the reflective layer is at least one metal selected from the group consisting of Cu, Au, Ag, Ni, Al, Cr, Ru, Re, Pb, Sn, In and Zn, or an alloy containing these metals.

5. The electrochromic mirror of claim 3, wherein at least one of the first electrode and the second electrode is any one selected form the group consisting of ITO (Indium Tin Oxide), FTO (Fluor doped Tin Oxide), AZO (Aluminum doped Zinc Oxide), GZO (Gallium doped Zinc Oxide), ATO (Antimony doped Tin Oxide), IZO (Indium doped Zinc Oxide), NTO (Niobium doped Titanium Oxide), ZnO, and a combination thereof.

6. The electrochromic mirror of claim 1, wherein the electrochromic material contains at least one metal oxide of tungsten, iridium, nickel and vanadium oxides.

7. The electrochromic mirror of claim 1, wherein the electrochromic material is an organic electrochromic material containing viologen or quinone.

8. The electrochromic mirror of claim 1, wherein the electrochromic material is any one selected from the group consisting of polythiophene, polyaniline, polypyrrole, polyanthracene, polyfluorene, polycarbazole, polyphenylenevinylene, and a derivative thereof.

9. A room mirror module for a vehicle, comprising an electrochromic mirror of claim 1.

* * * * *